JOHN ROHRER.
Improvement in Leveling Instrument.
No. 124,389.  Patented March 5, 1872.
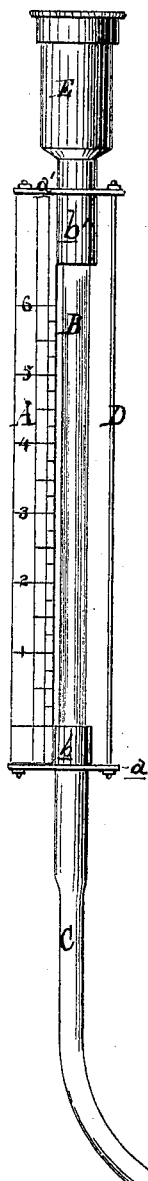
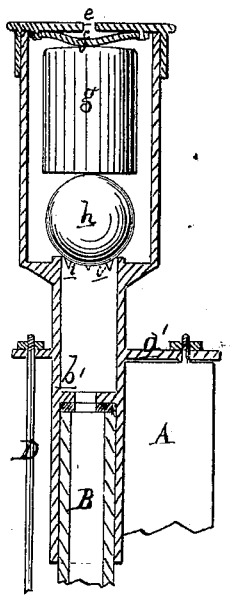
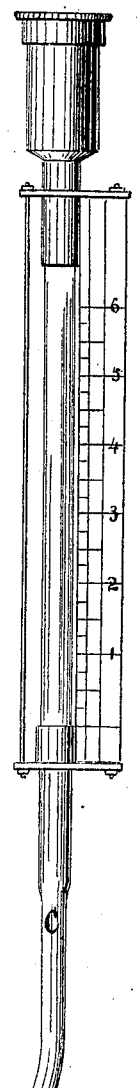
Fig. 1.
Fig. 2.
ATTEST:
Harry S. Sprague
H. F. Eberts
INVENTOR:
John Rohrer
per attorney
Thos S Sprague

124,389

UNITED STATES PATENT OFFICE.

JOHN ROHRER, OF SOUTH BEND, INDIANA.

IMPROVEMENT IN LEVELING INSTRUMENTS.

Specification forming part of Letters Patent No. 124,389, dated March 5, 1872.

*To whom it may concern:*

Be it known that I, JOHN ROHRER, of South Bend, in the county of St. Joseph and State of Indiana, have invented a new and useful Improvement in Leveling Instrument; and I do declare that the following is a true and accurate description thereof, reference being had to the accompanying drawing and to the letters of reference marked thereon and being a part of this specification, in which—

Figure 1 shows my instrument in elevation, and Fig. 2 is a vertical section of the top of one of the gauges.

Similar letters of reference indicate corresponding parts in the several figures.

The nature of this invention relates to an improved hydrostatic leveling instrument by means of which the operation of leveling and the reading off the difference in the planes of any two objects are greatly facilitated, especially where an obstruction may intervene between them. The invention consists in a pair of glass tubes, each provided with a scale and attached at their lower ends to the ends of a rubber hose of small diameter and of any required length, which hose is entirely and the tubes one-half filled with water or other fluid, the said gauge-tubes being provided with caps containing self-acting valves for opening the air-vents in their tops when in an upright position and closing them when the tubes are inclined, and thus prevent the escape of the fluid.

In the drawing, A represents a metallic scale-plate, having at the bottom and top a laterally-projecting plate, a a', respectively; through the latter passes a ferrule or socket, b', which receives the upper end of the glass gauge-tube B, the lower end of which rests on a shoulder in a similar socket, b, in the lower plate, through which it protrudes to receive the end of a flexible hose, C, to the other end of which a similar instrument is in like manner attached. A suitable packing or gasket should be provided at each end of the glass tube, to be set up by screwing down the top plate a' by means of the screw-nut d at the top of the scale-plate, where it projects through said top plate, and another at the top of the guard-rod D, which connect the plates a a', or by screwing the neck of the valve-case E down into the upper socket. The top of the valve-case has an opening, e, for a vent, and on the under side a valve, f, consisting of a strip of rubber or leather, is fastened at each end to the top. To the center of this valve a cork float, g, is fastened. The neck of the case projects up into it, and on it rests a leaden bullet, h, with notches i on the top of the tube to allow the fluid to pass freely. Any convenient length of gauge-glass may be used, with a corresponding scale, which should be laid off in inches and fractions, commencing at the top of the lower socket. In the present instrument a six-inch scale is shown.

To use the instrument, remove the cap of one of the valve-cases and pour in water or other fluid until the hose is filled and both gauge-tubes until the three-inch line is reached when both are on the same plane, and it is then ready.

It is evident that if one of the gauges be placed on a given plane, that the relative height or depression of another plane may be determined by placing the other gauge thereon and the difference read off the scale; bearing in mind, however, that if the second plane should be such that there is a difference of two inches between it and the other, the fluid will stand at two inches in one scale and at four inches in the other—in other words, the one scale expresses but one-half the variation in plane.

In leveling in mines and excavations where there are likely to be obstructions, rendering the work with the ordinary means very difficult, this device effects a great saving in time and labor and precludes the possibility of error.

It is not necessary that the water should stand at any particular height in the tubes, only that that height, whatever it is, should be known when standing on the same plane before commencing operations.

The weight of the cork floats draw down the valves from the vent-holes in the caps, when the tubes are held upright, allowing the pressure of the atmosphere to be exerted on the water, and thus establish the hydrostatic equilibrium; but, if the gauges be inclined, the leaden bullet in each will move partially out of its seat, and, pressing against the float, will close the valve, and in like manner, when the gauge is reversed in position, will its weight keep the valve closed. If one gauge-tube be dropped entirely below the plane of the other, the water rising into the valve-case will cause the cork float to close the vent, and thus prevent the escape of the fluid.

What I claim as my invention, and desire to secure by Letters Patent, is—

In a leveling instrument, the combination of the gauge-tubes B, the opening $e$, the valve $f$, the float $g$, and weight $h$, all constructed, arranged, and operating substantially as described and shown.

JOHN ROHRER.

Witnesses:
H. F. EBERTS,
HARRY S. SPRAGUE.